March 18, 1969 G. C. BROWN ET AL 3,433,427
REWIND CONTROL CIRCUIT
Filed June 8, 1967
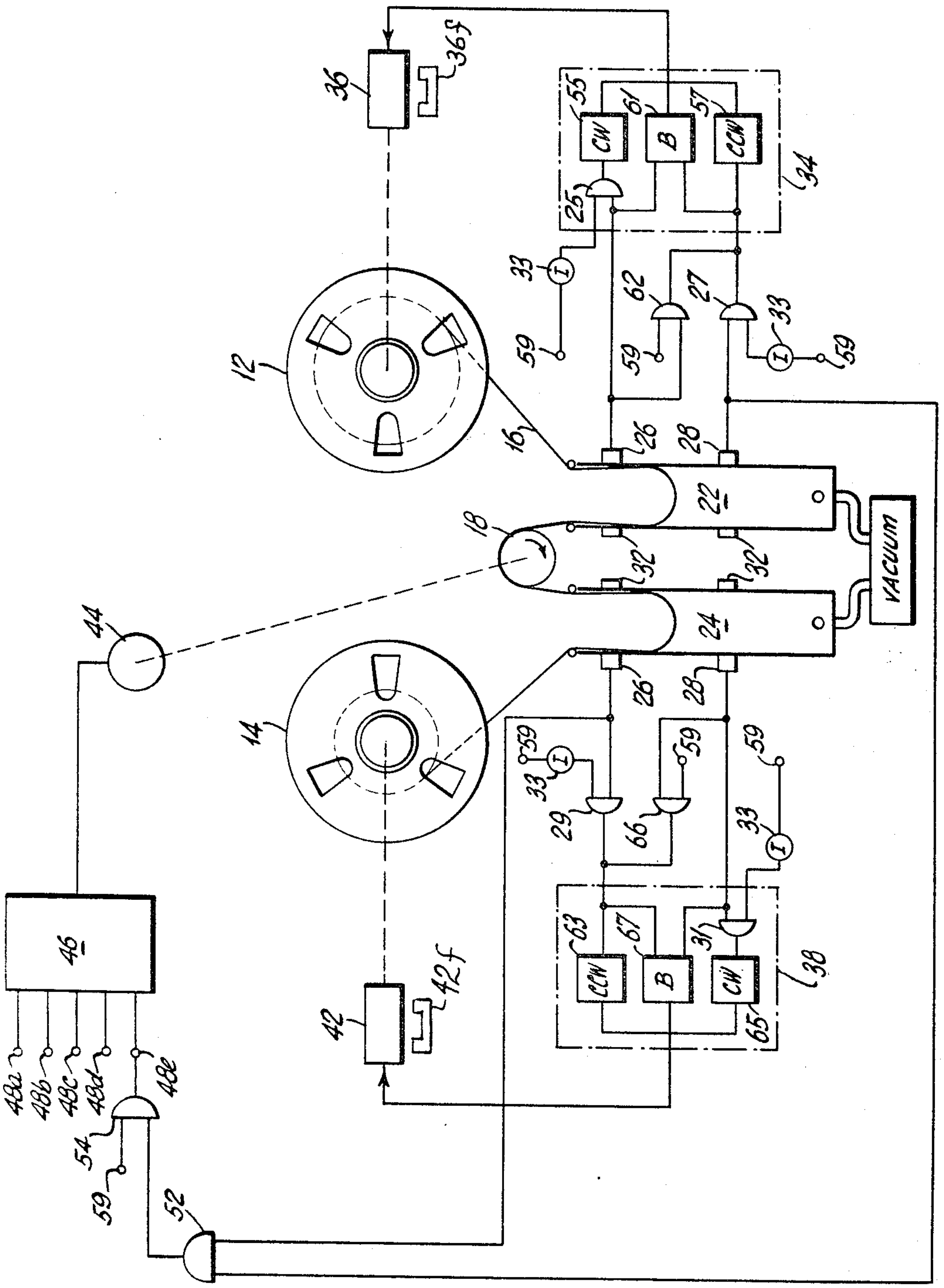
INVENTORS
GEORGE C. BROWN
FREDERICK G. MORITZ
BY Laurence J. Marhoefer
ATTORNEY 3,433,427

REWIND CONTROL CIRCUIT

George C. Brown, Syosset, and Frederick G. Moritz, Hauppauge, N.Y., assignors to Potter Instrument Company, Inc., Plainview, N.Y., a corporation of New York Filed June 8, 1967, Ser. No. 644,555
U.S. Cl. 242—55.12 4 Claims
Int. Cl. G11b *15/44;* B65h *23/32, 17/28*

ABSTRACT OF THE DISCLOSURE

In a single capstan magnetic tape transport, the reel servos during rewind are controlled by the lower machine reel sensor and the upper file reel sensor while the speed of the capstan is controlled by the upper machine reel sensor and the lower file reel sensor.

*Background of the invention*

This invention relates to a rewind system for a single capstan magnetic tape transport and, more particularly, to a rewind system for a transport employing a so-called on-off reel servocontrol system.

A copending application assigned to the assignee of this invention, Ser. No. 644,508, filed June 8, 1967, discloses a rewind system for a single capstan transport employing an on-off reel servocontrol. In that application, the reel servomotors operate in their usual operating mode during rewind and the capstan speed is varied between a higher and a lower speed depending upon the size of the tape loops in the buffers. Although this system is generally satisfactory, it can not be utilized advantageously in certain transports where it is difficult to increase the operating speed of the reel servomotors during rewind. One example is a transport in which the fields for the reel servomotors are provided by permanent magnets.

It is an object of this invention to provide a rewind system for single capstan transports that provides a shorter rewind time than systems known heretofore.

Another object of the invention is to provide a rewind system that can be used advantageously in a transport employing reel servomotors with permanent magnet fields.

*Summary of the invention*

Briefly, this invention contemplates the provision of a rewind system in which the capstan drives the tape during rewind with its speed controlled in accordance with the length of the buffer loops as in the aforementioned application Ser. No. 644,508. However, rather than increase the speed of the reel servomotors and control them in the normal operating mode as disclosed in that application, the machine reel feeds tape into its buffer as long as the loop is above the lower sensor therein and the file reel withdraws tape from its buffer as long as the loop is below the upper sensor in that buffer. When the machine reel loop drops below the lower sensor or the file reel loop rises above the upper sensor, the machine and file reels are braked, respectively.

Having briefly described this invention, it will be described in greater detail along with other objects and advantages in the following detailed description of a preferred embodiment which may be best understood by reference in the accompanying drawing which forms part of the instant specification and which is to be read in conjunction therewith and which like reference numerals are used to indicate like parts in the view.

*Brief description of the drawing*

The sole figure is a partial schematic and partial block diagram of a transport showing one embodiment of a rewind system of this invention.

*Description of the preferred embodiments*

Referring now to the drawing, a file reel 12 and a machine reel 14 are rotatably mounted on a chassis, not shown, and a tape 16 extends between these reels along a path that includes a centrally disposed capstan 18, a file reel vacuum buffer 22 and a machine reel vacuum buffer 24.

Each of the vacuum buffers 22 and 24 has an upper photodiode sensor 26 and a lower photodiode sensor 28 illuminated by lamps 32. AND gates 25 and 27, respectively, couple the outputs of the photodiode sensors 26 and 28 in the file reel vacuum column 22 to a file reel servocontrol 34 whose output energizes a file reel servomotor 36. Similarly, AND gates 29 and 31 couple the outputs of photodiode sensors 26 and 28 in the machine reel vacuum column 24 to a machine reel servocontrol 38 whose output energizes machine reel servomotor 42. The other inputs to AND gates 25, 27, 29 and 31 are coupled to a rewind select terminal 59 via inverters 33 to the end that gates 25, 27, 29 and 31 are enabled in the absence of a rewind command signal and are disenabled by the rewind command signal. The fields for reel servomotors 36 and 42 are provided by magnets **36*f* and 42*f***, respectively.

The arrangement and operation of the photodiodes 26 and 28 in the vacuum columns 22 and 24 and the file and machine reel servocontrols 34 and 38 may be similar to that disclosed in a copending application of Frederick G. Moritz, Ser. No. 545,769, filed Apr. 27, 1966 and assigned to the same assignee as this application. Briefly, as disclosed in that application, when the bight of the loop in the file reel buffer 22 rises above the upper sensor 26, a clockwise control circuit 55 energizes the file reel servomotor 36 to drive reel 12 in a clockwise direction; when it falls below the lower sensor 28, a counterclockwise control circuit 57 energizes the motor to drive the reel 12 in a counterclockwise direction; and when the bight of the loop is between the sensors 26 and 28, a brake control circuit 61 electrodynamically brakes the motor 36.

Similarly, when the bight of the loop in the machine reel vacuum column 24 rises above the upper sensor 26, a counterclockwise control circuit 63 energizes the motor 42 to drive reel 14 in a counterclockwise direction; when the loop drops below the sensor 28, a clockwise control circuit 64 energizes the motor 42 to drive the reel 14 in a clockwise direction; and when the bight of the loop is between sensors, a control circuit 67 electrodynamically brakes the motor 42. It will be appreciated that the outputs of sensors 26 and 28 are complenetary with respect to one another so that in normal operation when an upper sensor 26 is covered and a corresponding lower sensor 28 is uncovered, the servomotor associated therewith is electrodynamically braked.

The capstan 18 is driven by a directly coupled low inertia D.C. motor 44, which is energized by a suitable power supply 46. The power supply 46 has several selectable outputs for energizing the motor 44, which may be selected by the application of a suitable input to one or more of the input select lines **48*a* through 48*e***.

The output of the upper sensor 26 in the machine reel buffer 24 and the output of the lower sensor 28 in the file reel buffer 22 are coupled as inputs to an OR gate 52 whose output is coupled as one input to an AND gate 54. The other or enabling input to gate 54 is coupled to terminal 59 (the rewind command signal terminal), and the output of AND gate 54 is coupled to the terminal **48*e* of power supply 47. It should be noted that the arrangement for energizing and controlling the speed of the capstan motor during rewind is the same as that disclosed in the aforementioned copending application Ser. No. 644,508, to which reference may be made for further details. Briefly, as disclosed in that application, the capstan motor 44 runs at a high speed so long as the loop in the file reel buffer 22 stays above the lower sensor 28 and the loop in the machine reel buffer 24 stays below the upper sensor 26. If the loop in buffer 22 falls below sensor 28 or the loop in buffer 24 rises above sensor 26, the capstan motor 44** runs at a lower speed.

In rewind operation, AND gates 25 and 31 inhibit clockwise operation of the reel servos 12 and 14, respectively, since gates 25 and 31 are disenabled by the rewind command signal applied at terminals 59. Similarly, AND gates 27 and 29, which are also disenabled by the rewind command signal, prevent normal counterclockwise operation of the reels 12 and 14, respectively.

During rewind, an AND gate 62, which is enabled by a rewind command signal at terminal 59, couples the output of the upper sensor 26 in vacuum column 22 to the file reel counterclockwise control circuit 57. It will be appreciated, therefore, that the file reel 12 will be driven in a counterclockwise direction so long as the bight of the loop in column 22 is below the upper sensor 26; when it rises above sensor 26, the reel 12 is electrodynamically braked.

In a similar fashion, an AND gate 66, which is enabled by the rewind command signal at terminal 59, couples the output of the lower sensor 28 in column 24 to the counterclockwise machine reel control circuit 63. The machine reel 14, therefore, is driven in a counterclockwise direction so long as the bight of the loop in column 24 stays above the lower sensor 28; when the loop falls below the sensor 28, the motor 42 is electrodynamically braked.

To summarize, the rewind select signal enables AND gate 54 permitting high speed operation of the capstan 18 and disenables gates 25 and 31 preventing clockwise drive of the reels 12 and 14, respectively. Gates 27 and 29 are also disenabled, preventing normal counterclockwise rotation. Instead, the outputs of the upper sensor 26 in column 22 and the lower sensor 28 in column 24 control the counterclockwise rotation of the reels 12 and 14, respectively.

When the loops in columns 22 and 24 are between the upper and lower sensors 26 and 28, the capstan 18 is driven in a clockwise direction at a high rate of speed and the reels 12 and 14 are both driven in a counterclockwise direction at their normal operating speed. If the loop in the column 22 falls below the lower sensor 28, the rotational speed of the capstan 18 is reduced. Similarly, if the loop in column 24 rises above the upper sensor 26, the rotational speed of the capstan 18 is again reduced. If the loop in the column 22 rises above the upper sensor 26, the file reel 12 is electrodynamically braked, and if the loop in column 24 falls below the lower sensor 28, the machine reel is braked.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A high speed system for rewinding magnetic tape from a machine reel to a file reel mounted on a single capstan magnetic tape transport, comprising, in combination:

a machine reel vacuum buffer having an upper and a lower tape sensor,
a file reel vacuum buffer having an upper and a lower sensor,
a capstan motor coupled to the capstan for driving said capstan,
first means for energizing said motor at a first speed and a second higher speed,
a machine reel servomotor,
a file reel servomotor,
second means responsive to an output from the upper machine reel vacuum buffer sensor and the lower file reel vacuum buffer sensor for varying the speed of said capstan motor between said first and said second speeds,
third means responsive to an output of the lower machine reel vacuum buffer sensor for controlling the speed of said machine servomotor, and
fourth means responsive to an output of the upper file reel vacuum buffer for controlling the speed of said file reel servomotor.

2. A high speed rewind system for rewinding magnetic tape as in claim 1 wherein said third responsive means includes means for energizing said machine reel servo to feed tape into said machine reel buffer when the bight of a tape loop is above the lower sensor therein and for electrodynamically braking said machine reel servo when the bight of a tape loop is below said lower sensor and said fourth responsive means includes means for energizing said file reel servo to withdraw tape from said file reel buffer when the bight of a tape loop is below the upper sensor therein and for electrodynamically braking said file reel servo when the bight of a tape loop is above said upper sensor.

3. A high speed rewind system for rewinding magnetic tape as in claim 2 wherein said upper and lower sensors are photodiodes.

4. A high speed rewind system for rewinding magnetic tape as in claim 3 wherein said machine reel servomotor and said file reel servomotor have permanent magnet fields.

References Cited

UNITED STATES PATENTS

| | | | |
|---|---|---|---|
| 3,302,900 | 2/1967 | Messamer | 242—55.12 |
| 3,304,018 | 2/1967 | Kurth | 242—55.12 |
| 3,343,758 | 9/1967 | Hemdal | 242—55.12 |
| 3,354,318 | 11/1967 | Wahlstrom | 250—219 |

LEONARD D. CHRISTIAN, *Primary Examiner.*

U.S. Cl. X.R.

226—97